Dec. 6, 1966     E. C. WAHLBERG     3,290,491
AUTOMATIC MAILING MACHINE
Filed June 19, 1961     5 Sheets-Sheet 1
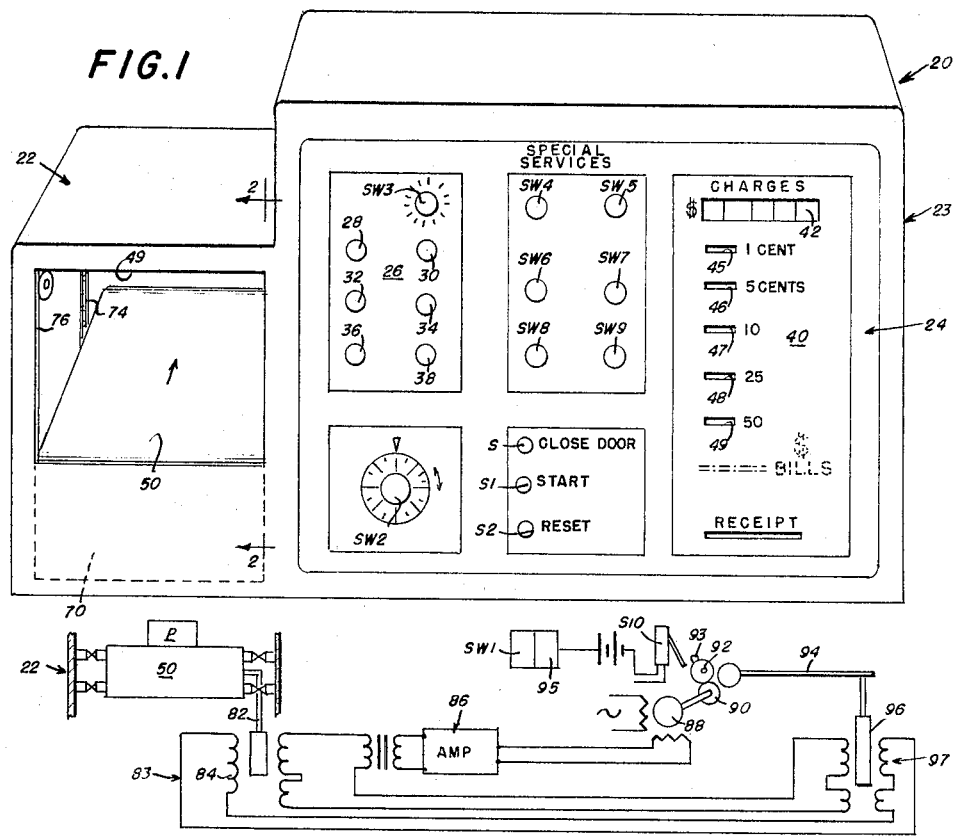
FIG. 1
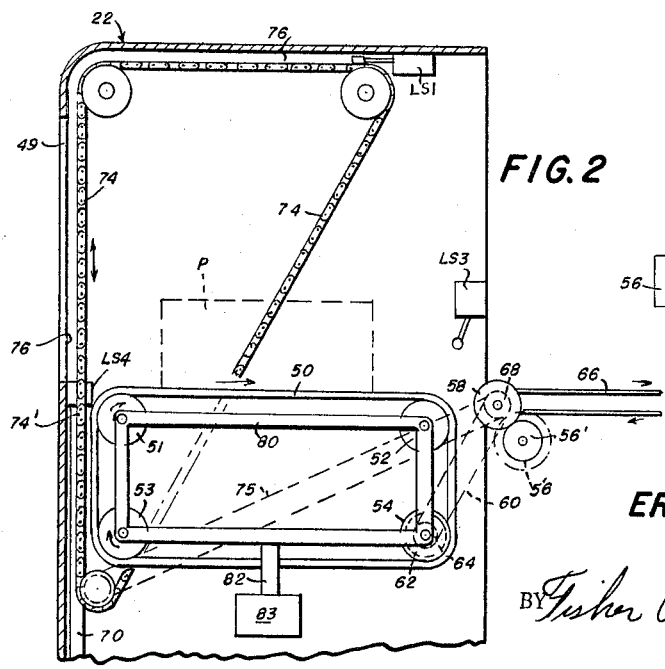
FIG. 2
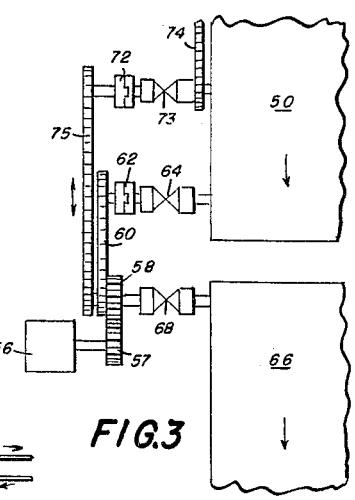
FIG. 3
FIG. 4
INVENTOR
ERIC C. WAHLBERG
BY Fisher Christen & Goodson
ATTORNEYS

INVENTOR
ERIC C. WAHLBERG

INVENTOR
ERIC C. WAHLBERG

INVENTOR
ERIC C. WAHLBERG

Dec. 6, 1966  E. C. WAHLBERG  3,290,491
AUTOMATIC MAILING MACHINE
Filed June 19, 1961  5 Sheets-Sheet 5

INVENTOR
ERIC C. WAHLBERG

BY Fisher Christen & Goodson
ATTORNEYS

United States Patent Office 3,290,491
Patented Dec. 6, 1966

3,290,491
AUTOMATIC MAILING MACHINE
Eric C. Wahlberg, 32 8th St., Stamford, Conn.
Filed June 19, 1961, Ser. No. 117,980
17 Claims. (Cl. 235—151.2)

This invention relates to a machine for automatically handling the many transactions associated with article shipping and routing. The embodiment shown and described is directed specifically to mail handling machines which automatically perform the functions of accepting a parcel, receiving payment therefor, weighing, routing, and computing charges while taking into account the various special services desired. Each of these functions are correlated, combined, and performed in response to various signals received from the person mailing the parcel or letter.

This application is a continuation in part of my co-pending application, Serial No. 740,484, filed on June 6, 1958, now abandoned.

One of the primary objectives of this invention is to provide a labor-saving device which will automatically perform the largely perfunctory steps necessary in computing the charges necessary to send a particular package of a certain weight to a particular destination, under certain conditions of service such as special delivery, insurance, air mail, registered, and so forth.

Another objective of this invention is to provide rugged, relatively inexpensive and fool-proof structure and circuitry to accomplish the above-mentioned functions. The invention provides for a balancing type circuit which will set up certain conditions as a result of the information fed to it, and balancing out these conditions in response to coins received, equal to the calculated charges computed by the machine.

A further objective of this machine is to provide a novel means to route packages received by the machine in response to directions easily given by the sender of the package.

The prior art shows various machines which accomplish several of the functions performed by this invention. However, heretofore, the nature of these machines has been marked by complexity and expensiveness. It is therefore one of the primary objectives of this invention to provide a machine of the nature described, having relatively inexpensive, easily repairable components.

A still further objective of this invention is to provide an automatic mail handling machine which is largely tamper-proof and has an operation which will be readily understood by the general public.

This invention is primarily concerned with the calculation of charges, reception of the proper amount of money corresponding to the charges, and routing the parcel to be sent. Electrical positioning means are used to represent the data necessary to the above transactions. Data represented in this manner is easily transferable to other uses. Auxiliary equipment to stamp the item with the proper data thereon, can readily be adapted to this machine by those skilled in the art. The intelligence or information necessary, in most cases, would be available directly from the circuitry available.

Further objectives and advantages of this invention will be apparent from the following description and claims wherein the construction, arrangement and cooperation of the several parts of the invention are set forth.

In the drawings:

FIG. 1 is a front perspective view of the invention;

FIG. 2 is a diagrammatic sectional view along the line 2—2 in FIG. 1;

FIG. 3 is a partial plan view showing portions of the conveyors and drive structure shown in FIG. 2;

FIG. 4 is a diagrammatic view showing one type of weight measuring assembly;

Figure 5:
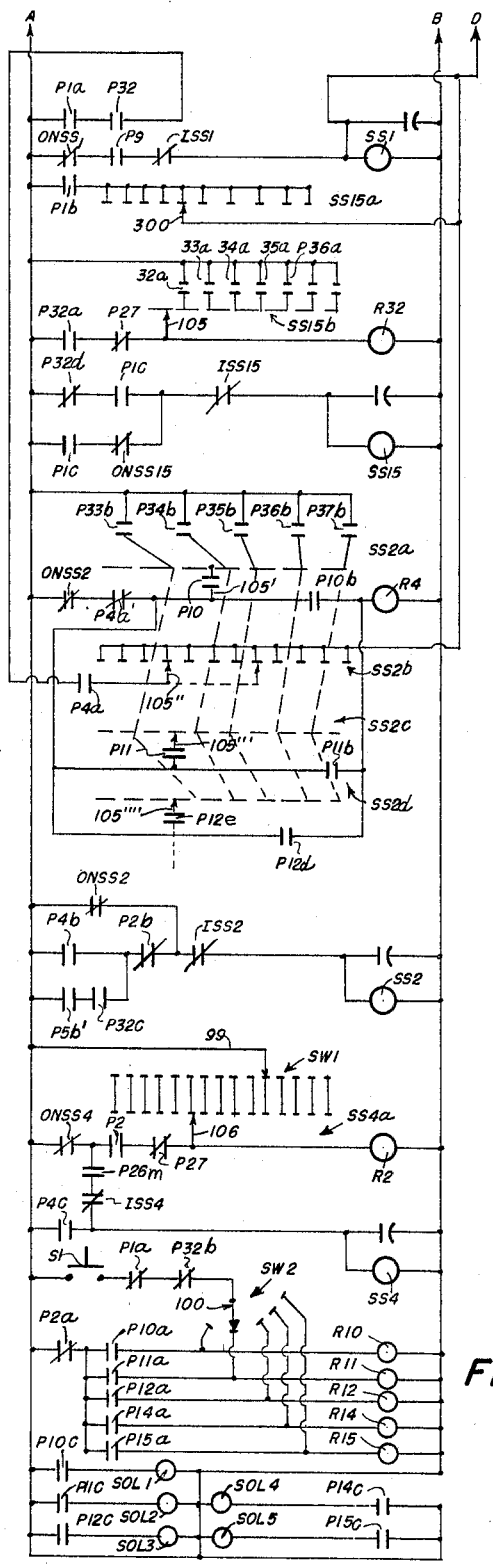
Figure 5:
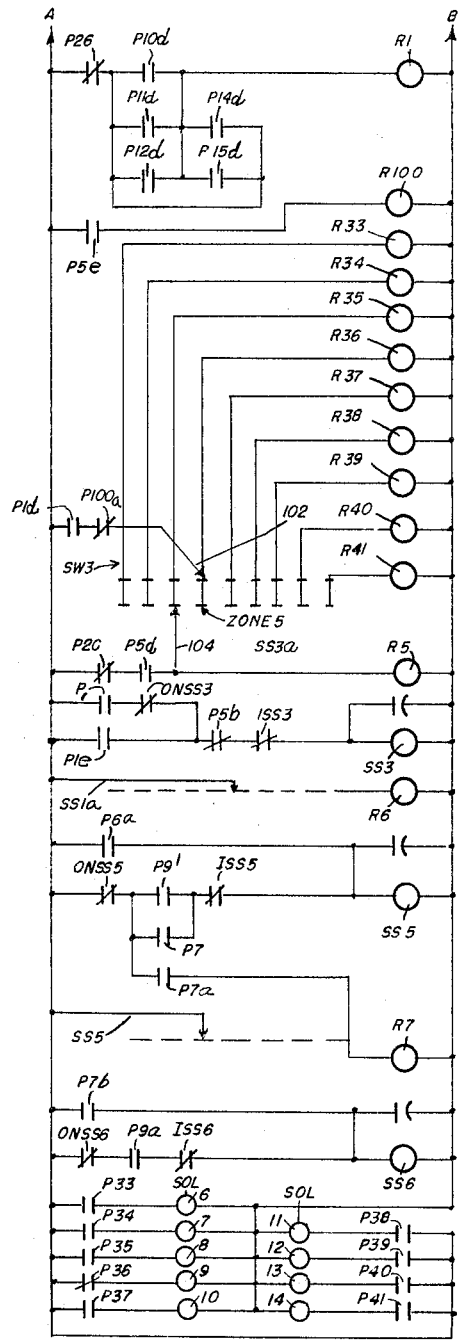
Figure 6:
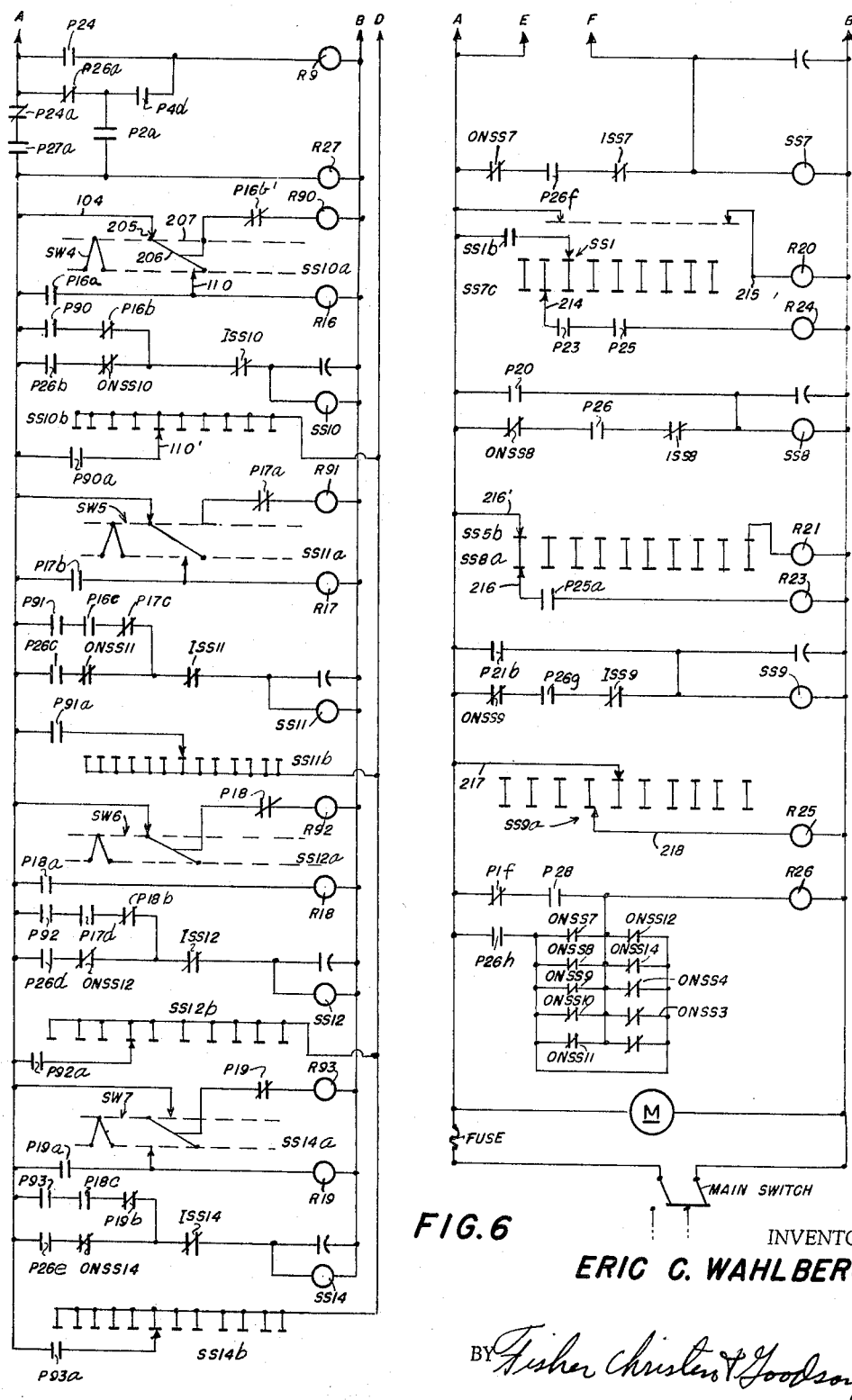
Figure 7:
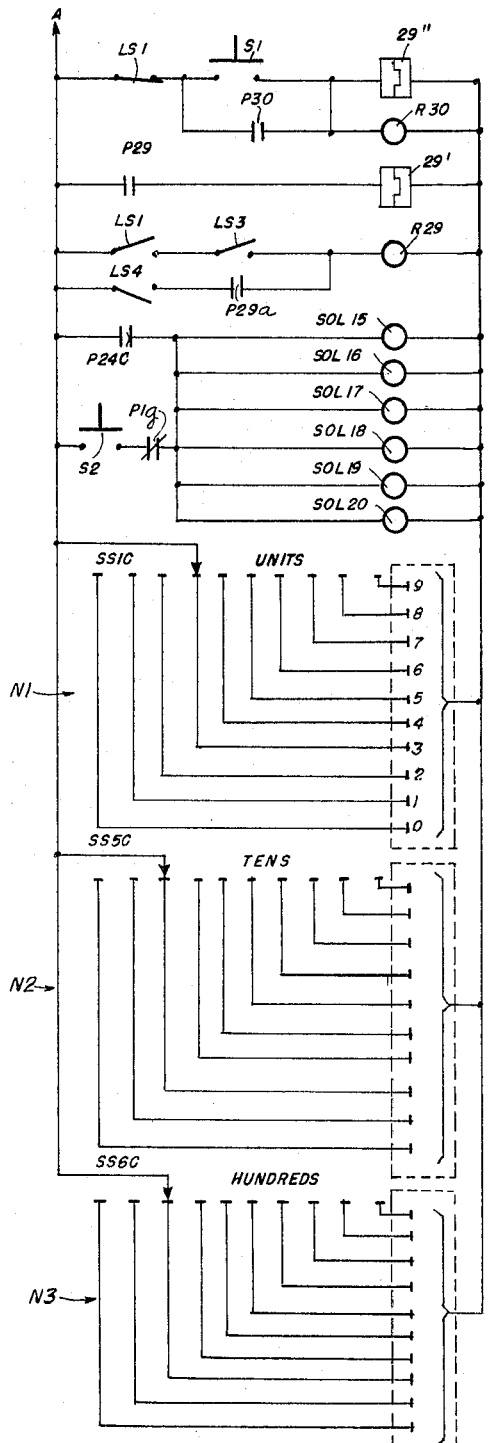
Figure 7:
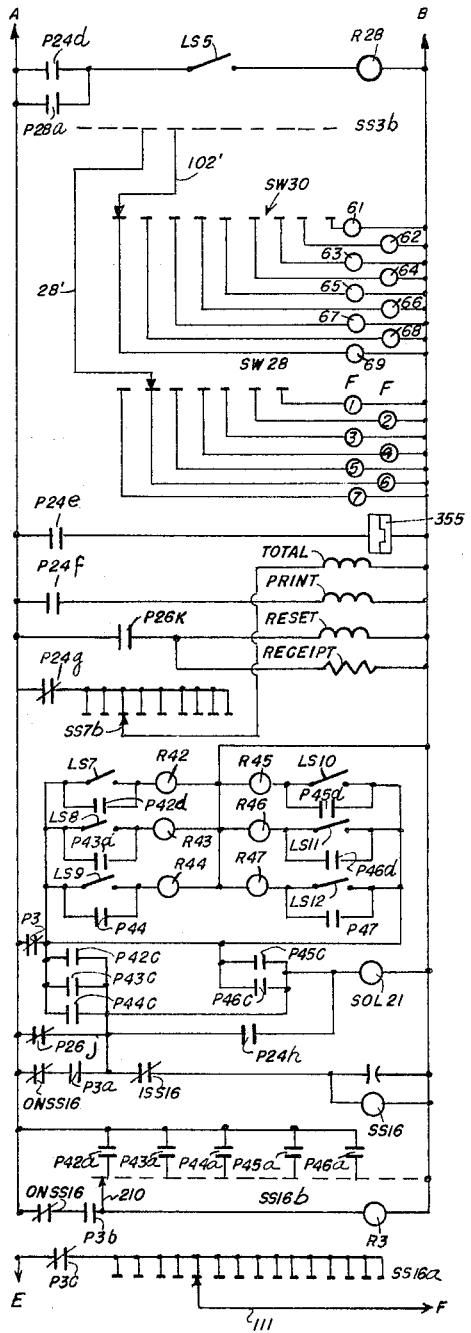
Figure 8:
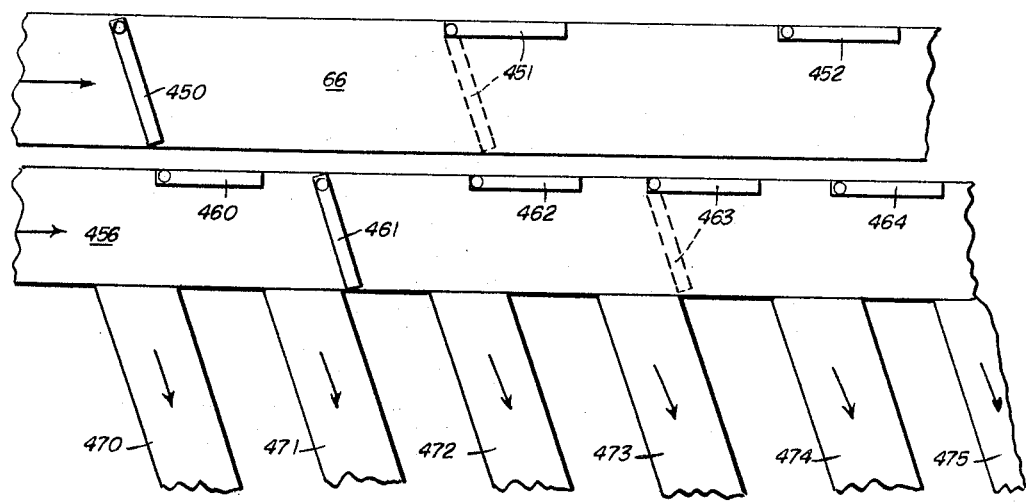

FIGS. 5, 6, and 7 are circuit diagrams of the calculating and balancing means of the invention; and FIG. 8 is a diagrammatic showing of the conveyor gate assembly.

A brief description of the function and operation of the invention along the lines of the accomplishments of the disclosed embodiment, will facilitate an understanding of the specific structure described below. The invention is most easily understood by going through the process of mailing a package. However, the invention is not meant to be limited to mailing devices, nor to mailing devices capable of receiving packages and letters only.

In general, the embodiment described below is for installation at a local post office. Assuming a person with a parcel or letter approaches the machine (FIG. 1), he would first note a package receptacle of a size determined by current Post Office regulations, and a control panel alongside the receptacle. Suitably situated on the machine would be an instruction panel explaining the steps necessary to operate the machine.

The instruction panel information discloses that the user should place his package in the receptacle. [Although not readily discernible to the operator, the bottom of the receptacle is a conveyor with an associated weighing means. The weight of the package activates a switch which closes a receptacle door, or as an alternative a manual door closing switch may be provided.] As will be described, the weight of the parcel is automatically transformed into useable data for the computations which are to be performed.

The remaining transmitting intelligence is then given to the machine by the operator via a series of control switches on the panel. A first control indicates the classification type of the item; that is, first class, second class, library book, film, catalogue, etc. A second set of controls permits the user to select the zone and city the particular parcel is to be sent. Another set of controls permits the user to select the special services desired such as special delivery and the like.

After all the necessary intelligence has been set in the machine, a start button is pushed and the machine calculates the amount of money necessary to send the package. The amount calculated is then posted in full view of the user.

Below the charge indicator, there are a series of coin-receiving slots. After the user deposits the amount of money posted on the indicator, the receptacle conveyor is activated and the package is started on its journey to its selected destination.

It can be seen that the machine must digest and compare various physical data and intangible data through a wide range of values, calculate the results with precision, and activate various structures to perform their assigned functions.

Current Post Office basic charges are based, in part, on the weight of the package and the geographic zone to which the package is to be sent. The basic charge will also be dependent on the classification of the item. Whether the item is sealed against inspection, whether it is film, library material and the like will all influence the basic charge. Auxiliary special service charges for insurance, special delivery, registered, air mail, and the like (which are normally fixed regardless of distance) must also be accounted for to give a total mailing charge.

The machine of this invention automatically combines the variables such as weight, classification, and zone segments of the mailing charges, and transfers these charges to a totalizing means. The individual special services requested are also sent to the same totalizing means, and the totalizing means computes and posts a sum which is equal to the mailing charges. After coins equaling the mailing charges have been deposited in the machine, the totalizing means is balanced, the item is routed and all the information switches are returned to their neutral position.

Referring to FIG. 1, there is shown a mailing machine embodiment 20, comprised generally of a package receptacle 22 and a calculating console 23. The console along its front surface has a control panel 24.

The control panel has a classification switch SW-2 with its associated indicia, such that the type item to be mailed may be set into the machine. These indicia will indicate classification of the parcel. Above SW-2 is the zone and city panel 26. This panel has a zone switch SW-3 and a plurality of city switches 28, 30, 32, 34, 36, and 38. Each of the contacts of SW-3 and the city switches is connected to a solenoid-activated gate for routing the packages as will be described below. The zone switch, in addition to its routing function, will give computation intelligence which will be correlated with the weight of the parcel.

Also on panel 24 are a plurality of special service switches SW-4, SW-5, SW-6, SW-7, SW-8, and SW-9. These switches will give further intelligence to the console to enable it to calculate the charges necessary to mail the item. Each of these switches will be calibrated with the necessary information to perform its function. In the described embodiment, the switches SW-4, SW-5, and SW-6 respectively indicate the following services:

Insurance (calibrated in dollars).
Special Delivery (Yes and neutral positions).
Registered (Yes and neutral positions).

The remaining switches could be included as new services become available.

A door closing button S is located on the panel to close the door after a package is inserted. A start button S-1 and a re-set button S-2 are arranged with the door closing button below the special services panel of switches. In the event an incorrect setting is placed on any of the dials prior to depositing money, S-2 provides means to remove the previous incorrect settings.

A coin-reception panel 40 has a charge-indicating dial 42, a receipt-issuing slot 44, and a plurality of coin slots 45, 46, 47, 48, and 49, corresponding respectively to pennies, nickels, dimes, quarters and halves of dollars. Auxiliary equipment such as bill-recognizing devices may be used with this machine if desired as could change return mechanisms. The particular means for determining the money amount balance signal is not essential to the invention.

WEIGHT MEASURING APPARATUS

The first intelligence received by the console is the weight of the package. Referring to FIGS. 2 and 3, it is shown that the bottom of receptacle 22 is a scale platform comprised of an endless conveyor belt 50 riding on four resiliently hung roller guides 51, 52, 53, and drive roller 54. The belt is driven by a motor 56 which is connected to drive roller 54 via gears 57 (FIG. 3) and 58, chain 60, clutch 62, and the flexible coupling 64. The motor 56 also drives a routing conveyor 66 via gears 57, 58, and a flexible coupling 68. An overhead type flexible door 70 is operated by motor 56 via gears 57, 58, chain 75, clutch 72, flexible coupling 73, and chain 74. Door 70 is connected to chain 74 at a point 74'. The door 70, which may be segments of heavy neoprene or the like, rides in a recess 76 along the receptacle opening 49 of receptacle 22. For purposes of clarity some of the above structure is shown diagrammatically.

The outer ends of each of the rollers 51, 52, 53, and 54 are supported to the receptacle frame by flexible coupling units similar to 64 and 68. A rectangular rigid framing member 80 is attached to the rollers in a manner which will not interfere with their rotation, but which will reflect the vertical deflection in the conveyor caused by the weight of a package on the conveyor assembly.

Attached to the bottom of frame 80 is an armature 82 movable within a weight-determining device 83. The assembly and its operation are diagrammatically shown in FIG. 4. The weight of a parcel P placed on conveyor 50 causes armature 82 to assume an unbalanced position within a differential transformer 84. The signal caused by this unablanced condition is amplified by the amplifier system 86. The amplified signal is transferred to a servo 88 which rotates a gear 90. The gear 90 in turn is geared to both a cam gear 92 and to an armature linkage 94. Cam bearing 92 has a boss 93 thereon which will contact a leaf contact of switch S-10 upon each rotation thereof. Each contact of the boss 93 on the leaf contact activates a rotary solenoid 95. The solenoid 95 has an associated ratchet (not shown) such that the solenoid will assume and retain a particular position, depending on the number of activations received from S-10.

The solenoid 95 physically positions arm 99 (FIG. 5) of weight switch SW-1. The contact end of arm 99 lies along a bank of contacts of SW-1. Although the physical connection between solenoid 95 and arm 99 is not shown, they may be connected in any convenient or conventional fashion. A stepping switch SS-4, associated with SW-1, has a corresponding bank of contacts whose operation will be described herein below.

Referring back to FIG. 4, the linkage 94 (also operated by gear 90) moves an armature 96 within a transformer assembly 97 to develop a feedback signal to balance the signal in transformer assembly 84. This will inactivate the servo 88, stopping rotation of gear 92, when conveyor 50 has fully sensed the weight of the package. The rotation of gear 92 is calibrated so that each rotation will indicate a workable unit of postage weight. For instance, if each rotation indicates one ounce, this also would indicate a particular charge which may be represented along the contacts of SS-4.

CALCULATING MECHANISM

The machine at this point has its first item of intelligence represented by the position of arm 99 on SW-1. Each contact represents a unit of weight along the contact bank of its associated stepping switch SS-4. This weight item must be correlated with the classification of the item to be mailed, the post office zone of the packages' destination and the special services to be selected before any usable data is obtained. For this purpose, there is provided the various switches on the console panel. The operator, after placing his parcel on the receptacle and closing door 70, begins making the proper setting on the other dials. The switch SW-2 is turned such that its indicator arrow indicates the items' classification. SW-3 is turned to the desired mailing zone, and likewise one of the switches 28 through 38 to the selected city.

SW-4, the insurance switch, has its dial calibrated in dollars corresponding to the value of the parcel. SW-5, the special delivery switch, merely has a neutral and a "Yes" position. Succeeding switches for registration, special handling, air mail, etc. may be added as the circumstances call for them.

The switch SS-1 (FIG. 6) is the totaling switch of the circuit. Pulses sent to this switch will represent the cost to the sender or operator. The weight and zone information must be combined prior to pulsing SS-1, because the cost of sending a parcel of a certain weight will vary from zone to zone. The cost of the special services are the same regardless of weight, classification and zone and, therefore, can pulse SS-1 directly.

After each switch is set with its selected information and the item is on the conveyor, the start button S-1 (FIG. 5) is depressed.

When button S-1 is depresesd, the circuit is closed through the selected contact on SW₂. This occurs through the normally closed contacts P1a and P32b and the associated relay in series with the selected contact, which in this case is $R_{11}$. The arm 100 of $SW_2$ working directly in response to the knob on the console closes the particular contact representing the classification of the package to select the relay $R_{11}$. $R_{10}$ and $R_{12}$ through $R_{15}$ each represent other non-selected classification relays.

$R_{11}$ is energized which in turn closes the normally open contact $P_{11a}$ locking the relay $R_{11}$ into the circuit with normally closed contact $P_{2a}$. $R_{11}$ selects a particular bank of contacts of SS–2, each bank of which in most instances have a different scale of values for different classification of the parcel. There can be only one classification of package in the receptacle at one particular mailing. The relays $R_{10}$ and $R_{15}$ are chosen by turning switch SW–2 to the classification of the package. For instance, if the switch stops on the first contact, $R_{10}$ will be energized or if on the last contact, $R_{15}$ will be energized. These relays will close their corresponding contacts such as $P_{10b}$, $P_{11b}$ to select for the circuit a corresponding bank of contacts such as $SS2a$, $SS2b$, etc. At no time are two of these contacts in the circuit at the same time. The banks shown are $SS2a$, $SS2b$, $SS2c$ and $SS2d$, of course continue for as many classifications as the machine is adapted to handle. The relay $R_{11}$ causes contact $P_{11d}$ to close, which brings into the circuit and energizes relay $R_1$. Relay $R_1$ opens the normally closed contact $P_{1a}$, which then positively removes $SW_2$ from the circuit.

For reasons of clarity the banks of controls $SS2a$, $SS2b$, $SS2c$ and $SS2d$ are shown quite diagrammatically. For purposes of this invention, however, it need only be understood that banks representing different values with circuitry identical to $SS2a$, may be selected.

In the example being described, let it be assumed that arm 102 (FIG. 5, right side) of zone switch SW–3 is at zone 5, which would be opposite a selected relay R38. R38 is energized because contact $P_{1d}$ has been closed by the energizing of relay $R_1$. SW–3's corresponding stepping switch shown diagrammatically as SS3, by means of interrupted contact switch $I_{SS3}$, steps its arm 104 along the bank of contacts until its position is on the same contact as arm 102. Relay $R_5$ is thus energized and held in the circuit by the closing of the normally open contact $P_{5d}$. Normally closed contact $P_{5b}$ is opened causing SS3 to stop stepping. Further, the energizing of $R_5$, closes contact $P_{5e}$, causing relay $R_{100}$ to energize and open the normally closed contact $P_{100a}$, the operation of which removes SW–3 from the circuit.

In the circuitry being described, the cost of sending a parcel of unit weight and having a particular classification is represented on the particular bank of SS2 selected. This cost multiplied by the zone number to which the parcel is to be sent will give the cost of sending a unit weight of a particular classification to a selected zone. This combined cost multiplied by the number of unit-weights in the parcel will give the basic mailing cost to send the parcel, exclusive of special services.

A stepping switch $SS_{2b}$ is used to correlate the data from SW–2 and SW–3 and represent it to the totalizing switch SS1. There is normally a different charge for the first unit of weight for each zone. $SS_{15}$ takes this normally different charge and presents it to $SS_1$ before the remainder of the units are processed. An arm 105 responsive to stepping switch $SS_{15}$ will move until it reaches the closed contact $P_{36a}$, $R_{32}$ is then energized and $SS_{15}$ is stopped and deenergized. All the while $SS_{15}$ has been stepping, $SS_1$ has been pulsed through arm 300 and $P_{1b}$. When arm 105 of $SS_{15}$ has completed its cycle (arm 105 at $P_{36a}$), $R_{32}$ is energized and the classification of package circuit is placed in circuit through the closing of contacts $P_{32}$ and $P_1$ via line 301. Relay 36 when locked in, closes contact $P_{36b}$ as well as $P_{36a}$. Since contact $P_{1c}$ is also closed by relay $R_1$, stepping switch $SS_{15}$ will be stepped by interrupter switch $ISS15$ until the connection from contacts $P_{36b}$ is matched by arm 105. At that instant, the relay $R_{32}$ is energized causing the normally open contact $P_{32a}$ to close, locking $R_{32}$ in. The contact $P_{32d}$ is opened, stopping the stepping of $SS_{15}$ and completing the circuit to the selected bank of contacts of SS2 by the closed contact P32. Also the stepping circuit to SS2 is energized through closed contacts $P_{32c}$ and $P_{5b}$.

The selection of the bank of contacts of $SS_2$ to be used is accomplished through the setting of $SW_2$. This energizes a relay (in this case) $R_{11}$. $R_{11}$ closes contact $P_{11a}$ and locks $R_{11}$ into the circuit. Also $R_{11}$ closes contacts $P_{11}$ and $P_{11b}$ of the $SS_{2c}$ bank of contacts of the $SS_2$ stepping switch. Thus the bank of contacts of $SS_2$ is established and arm 105''' is connected into the pulsing circuit.

The selected arm 105 (105''' in this instance) of the selected bank of SS2 will step and send pulses to SS1 until 105''' matches the contact $P_{36b}$. At that instant, $R_4$ is energized and locks itself in through ON SS2 and $P_{4a}$. When $R_4$ is energized, the continuing pulsing of SS2 (beyond contact $36_b$) does not step SS1 since the $P_{4b}$ contact has opened the pulse transmitting circuit of $SS_{2b}$. When arm 105' has stepped to its home position (not shown but to the right of $P_{37b}$ as viewed in FIG. 5) it connects with off normal contacts of ON SS2 and opens the $R_4$ relay and the pulse transmitting circuit from SS2 to SS1 is re-established and arm 105' begins stepping again and transmits pulses to SS1 until it reaches $P_{36b}$ when $R_4$ is energized again.

Each time $R_4$ is energized SS4 is stepped one as a result of $P_{4c}$ closing the SS4 circuit. In effect, the circuit is multiplying the weight times the selected classification and the pulse equivalent of the zone chosen. In other words, SS4 represents the weight, $R_{36}$ is the selected zone equivalent, and $R_{11}$ is the classification of the package, in this case $SS2c$.

The stepping of SS2 and SS4 is automatically continued until arm 106 matches the weight switch as represented by arm 99. At this point, the number of pulses which have been sent to SS1 represent the cost to mail the parcel as far as weight, zone, and classification are concerned.

When arm 106 matches arm 99, the relay $R_2$ is energized which drops out Relay $R_{11}$ by opening $P_{2a}$ and sequentially relay $R_1$ by opening $P_{11d}$. Any further stepping of SS15, SS4, or SS2 will not pulse SS1.

Stated another way, a particular level or bank of values on SS2 was selected for classification of the $SW–2–R_{11}$ circuitry. Through $SW–3–R_{36}$ circuitry, the classification value and zone were combined to determine the number of pulses SS1 should receive per unit of weight. The weight determined by the SW–1 conveyor arrangement determines the number of times the value computed by the classification-zone circuitry should be multiplied and sent to SS1. The stepping procedures of SS2 and SS4 continues until SS4 matches the weight switch SW1. When this occurs, relay $R_2$ is energized. When SS4 matches arm 99 of SW1, the energization of relay $R_2$ drops out $R_{11}$ and $R_1$.

All circuits mentioned above are now opened excepting the homing circuits. Homing circuits are those circuits which operate after $R_2$ is energized and merely return the stepping switches to their start position. Now any further stepping of the aforementioned steppers does not step the SS1 stepping switch. SS2, SS4, and SS15 are independently homed by means of their associated interrupter and off normal contacts, and such stepping does not pulse SS1 as far as the transaction being described is concerned. The homing of stepping switches is well within the understanding of those skilled in the art.

The charges, as represented by steps or units along SS1, must be represented in a more usable form. This is accomplished through stepping switches SS5 and SS6, representing tenths and hundredths while SS1 is used to represent units. This can best be observed by referring to the right hand portion of FIG. 5.

In the process of stepping SS1 in the foregoing procedure, after every ten steps, $R_6$ is energized and SS5 is pulsed one step. Likewise, when SS5 has reached its tenth step, relay $R_7$ pulses SS6 one step. As can be seen, the number of steps along SS1 are now represented in hundredths, tenths, and units along SS6, SS5, and SS1, respectively. The basic charge to mail the parcel is now represented on these switches. The total charge will depend on whether any special services are selected.

SPECIAL SERVICES

As seen in FIGS. 5 and 6, relay R2, having been energized in the foregoing procedure, has energized R27, by closing the normally open contact P2d. R27 locks itself in by closing R27a. This establishes the necessary connections so that the special service switches SW4, SW5, SW6, etc. may be scanned. The services are scanned successively beginning with SW4. Although the switch is represented as the multicontact type, it has a two position switch arm 104 for the instant purposes. The multicontact arrangement is preferable in the event in the future, special services of varying degree and cost become available. Point 205 represents the neutral or "No" position and Point 207 represents the "Yes" position. The shunt 206 can be varied by a mechanic as the particular charge for a service might vary according to changing Post Office regulations.

When arm 104 is at point 205 (neutral), R16 will be energized, thus transferring to the next service as represented by SW5. However, if arm 104 of SW4 indicates that the service is desired by making contact with point 207, R90 is energized therby closing the circuit to stepping switch SS10a and the SS10b circuit by closing P90a and then to the SS1 counting circuit. In conventional fashion SS10 will step arm 110 and 110′ until arm 110 is opposite the electrical point 207. Each step in the matching arm 110 is accompanied by a like step in the pulse arm 110′. Each step, therefore, will pulse SS1 and add to charges represented on SS1, SS5, and SS6.

After point 207 is reached by arm 110, relay R16 is energized and locks itself in by closing P16a, and thereby transfers the circuit to SW5. Concurrently, R90 is de-energized by the opening of P16b. This procedure continues until all the services SW6, SW7, etc. are scanned and passed or their counting pulses sent to SS1 in exactly the same fashion as that described for SW4.

COIN MATCHING CIRCUITRY

The machine provides stepping circuitry to recognize the coins fed to the machine in response to the indication of the counting mechanism. Referring to FIG. 7, the coin recognizing circuit includes coin switches LS7, LS8, LS9, LS10, LS11 and LS12, which correspond to pennies, nickles, dimes, quarters and halves and dollars respectively. The above switches, when activated, respectively energize relays R42, R43, R44, R45, R46 and R47 each time a coin is deposited and contacts their respective limit switch arms. For instance, when a nickle is deposited in slot 46, LS8 makes contact and energizes relay R43, which in turn closes contact P43a. Arm 210 of SS16 then steps until it matches the contact corresponding to 43a. R3 is energized locking itself in through ON SS16 and contact P3b. Each step of arm 210 causes a like step in arm 111. $P_{3c}$ opens pulsing circuit of SS16 (via F) to stepping switch SS7 shown in FIG. 6.

Referring to the right hand portion of FIG. 6 there is shown the circuitry by which the counting pulses are matched by the coin pulses. Each pulse along SS16, drives the SS7 pointer 214 and 214′ since relays $R_{23}$ and $R_{25}$ are not energized. When pointer 214′ reaches the end of the contacts, point 215, $R_{20}$ is energized and SS8 is pulsed. This is repeated in a like manner by arms 216 and 216′ and 218 and 218′ until relays 21 and 25 are energized.

Continuation of this procedure is effected until the SS9 pointer 218 matches the SS6 pointer 217. $R_{25}$ is then energized. The final result is that SS8 pointer matches SS5 and SS7 pointer matches SS1 pointer. Relay $R_{24}$ is then energized because $P_{23}$ and $P_{25}$ have both been energized.

The energizing of relay $R_{24}$ indicates that the coin pulses have matched the counting pulses and the parcel may be sent to its destination.

A safety feature is shown on FIG. 7, the energizing of $R_{24}$ causes contact $P_{24h}$ to close which contact is in series with the coin slot closure solenoid $R_{21}$. This insures against further insertion of coins after the correct amount has been deposited. Relay 112 is also energized each time a coin is inserted, and de-energized after it is counted. This is done through the secondary circuit $P_{42}$ to $P_{46}$ and $P_3$. $P_3$ also deenergizes when the counting is completed.

ROUTING ASSEMBLY

When the package is placed on the weighing platform, S1 is pushed to close the door by means of door clutch 29″. When the door is closed LS1 is closed and clutch 29″ is energized and conveyor 50 begins traveling.

As the item is transferred from conveyor 50 to conveyor 66, switch $LS_3$ is contacted which causes relay $R_{29}$ to be energized which in turn is connected to open door 70. When the door is open, the door will actuate LS4 and clutch 29 and R29 are deenergized, and the next item may be inserted.

When the item mentioned previously is passing out of the weighing chamber it contacts its selected routing gate along the conveyor 66, LS5 is actuated causing relay R28 to be deenergized.

Relay $R_{24}$ also energizes relay $R_{28}$ (via $P_{24d}$) which locks itself in via contact $P_{28a}$ and LS5. This in turn energizes the gating solenoids selected by SW3 and the city selected switches 28 through 38. The conveyor clutch solenoid is for operation of conveyor 50 also energized by the energizing of Relay 24.

Referring now to FIG. 8, a plurality of gates such as 450, 451 and 452 are angularly spaced along conveyor 66. These gates are hinged to swing across the conveyor and push a parcel onto a traveling conveyor 456 which is parallel to 66 and slightly below. The gates are controlled by solenoids such as 61–69 shown in FIG. 7. The arm 105′ which works concurrently with arm 102 of SW3 selects the particular gate to swing transverse of conveyor 66 and force the mailed parcel to conveyor 456.

Spaced along conveyor 456 are a plurality of city gates 460, 461, 462, 463, etc. A series of the city gates such as 461, 462, and 463 are present for each zone gate, in this case zone gate 450. As seen in FIG. 7 these gates are controlled by a sereis of city solenoids F1–F6. The arm 28′, for instance, is the contact arm of switch 28.

A plurality of transverse conveyors such as 470, 471, 472, 473, etc. are positioned opposite each of the city gates. These conveyors lead to assembly centers where the parcels may be further processed.

INDICATOR ASSEMBLY

In FIG. 7, indicator lights N1, N2, and N3 record the charges for the services. The unit light circuit is controlled by stepping switch SS1 and SS1c. The tens light $N_2$ circuit is controlled by stepping switch SS5 and SS5c. The hundreds light circuit $N_3$ is controlled by stepping switch SS6 and SS6c. The particular means for making this representation is not within the scope of this invention. The particular indicator used to transfer the data from SS1, SS5, and SS6 is not important and is not within the scope of this invention. Any indicator which will indicate the data gained from the position of the contact arms of the counting switches in dollars and cents will be sufficient.

MISCELLANEOUS CIRCUITRY

The following limit switches are included in the routing assembly:

LS1 is contacted and closed by door 70 when the door fully closes the receptacle.

LS3 is contacted and closed by package as it leaves conveyor 50.

LS4 contacted and closed by door 70 when the door is in the open position.

LS5 which is connected in series with the grating solenoids and controls energization of relay 28.

Solenoids 15–20 are used to reset all the switches on the panel when $R_{24}$ is energized. As can be seen, $R_{24c}$ closes the circuitry to these solenoids when $R_{24}$ is energized. Solenoid 21 merely closes a door across the coin slots when the correct amount of money has been deposited. Solenoid 95 is provided to reposition the weight switch upon each cycle of operation.

The closing of reset switch S2 will accomplish this same function.

The representations made on FIG. 7 of "Total," "Print," "Reset," and "Receipt" are merely inserted to show the ease of inserting and adapting new circuitry to the invention.

It should be noted that for clarity of operation, similar components in similar banks of circuits have the same numerals with different letter designations.

As a further aid in understanding the invention, I have listed the relays of the calculating and routing circuitry with a short function statement and the normal condition of their contacts:

|   | Normally Closed | Normally Open |
|---|---|---|
| $R_1$—Starts circuit | | |
| $P_1$—Energizes type package circuit | | X |
| $P_{1a}$—Removes circuit to $SW_2$ | | |
| $P_{1b}$—Connects $SS_{15a}$ in circuit | | X |
| $P_{1c}$—Closes stepping circuit to $SS_{15}$ | X | |
| $P_{1d}$—Closes zoning circuit to $SW-3$ | | X |
| $P_{1e}$—Closes circuit for stepping $SS_3$ | | X |
| $P_{1f}$—Resets $SS_3$ | X | |
| $P_{1g}$—Energizes Sol. 15–20 | X | |
| $R_2$—Weight lock in relay | | |
| $P_{2a}$—Release type package circuit relays | X | |
| $P_{2b}$—Steps circuit of $SS_2$ | X | |
| $P_{2c}$—Lock in zone relay $R_5$ | X | |
| $P_2$—Lock in $R_2$ | | X |
| $P_{2d}$—Lock in $R_{27}$ | | X |
| $P_1$—$SS_3$ | X | |
| $R_4$—Type package pulse eliminating relay | | |
| $R_{4a}$—Locks in $R_4$ | | X |
| $P_{4a}$—Eliminates pulse $SS_{2b}$ | X | |
| $P_{4c}$—Steps $SS_4$ | | X |
| $P_{4d}$—Locks in $R_9$ | | X |
| $P_{4b}$—Steps $SS_2$ | | X |
| $R_5$—Zone lock in relay | | |
| $P_{5a}$—One starts stepping $SS_2$ | X | |
| $P_{5b}$—One opens stepping $SS_3$ | | X |
| $P_{5c}$— | | |
| $P_{5d}$—Locks $R_5$ in | | X |
| $P_{5e}$— | | |
| $R_6$—Transfer relay | | |
| $P_6$—Steps $SS_5$ | | X |
| $P_{6b}$— | | |
| $R_7$—Transfer relay | | |
| $P_{7a}$—Locks in $R_7$ | | X |
| $P_{7b}$—Steps $SS_6$ | | X |
| $P_7$—Steps $SS_5$ | | X |
| $R_8$— | | |
| $R_9$—Reset relay | | |
| $P_{9a}$—Resets $SS_6$ | | X |
| $P_9$—Resets $SS_1$ | | X |
| $P$— | | |
| $R_{10}$–$R_{15}$—Type package relay | | |
| $P_{10a}$—Lock in $R_{10}$ | | X |
| $P_{10b}$, $P_{10e}$—Circuit to $R_4$ | | X, X, X |
| $P_{10c}$—Energizes Sol. 1 | | X |
| $P_{10d}$—Energizes $R_1$ | | X |
| $R_{16}$—Special service relay | | |
| $P_{16a}$—Lock in $R_{16}$ | | X |
| $P_{16b}$—Step $SS_{10}$ | X | |
| $P_{16b}$—Open $R_{90}$ | X | |
| $P_{16c}$—Steps $SS_{11}$ | | X |
| $R_{17}$—Special service relay | | |
| $P_{17a}$—Controls $R_{91}$ | X | |
| $P_{17b}$—Locks in $R_{17}$ | | X |
| $P_{17c}$—Steps $S_{11}$ | X | |
| $P_{17d}$—Steps $SS_{12}$ | | X |
| $R_{18}$—Special service relay | | |
| $P_{18a}$—Locks in $R_{18}$ | | X |
| $P_{18b}$—Steps $SS_{12}$ | X | |
| $P_{18c}$—Steps $SS_{14}$ | | X |
| $P_{18}$—Controls $R_{92}$ | X | |
| $R_{19}$—Special service relay | | |
| $P_{19}$—Controls $R_{93}$ | X | |
| $P_{19a}$—Locks in $R_{19}$ | | X |
| $P_{19b}$—Steps $SS_{14}$ | X | |
| $R_{20}$—Transfer Relay (1–10) | | |
| $P_{20}$—Step $SS_8$ | | X |
| $R_{21}$—Transfer relay (10–100) | | |
| $P_{21b}$—Steps $SS_9$ | X | |
| $R_{22}$— | | |
| $R_{23}$—Match relay | | |
| $P_{23a}$— | | |
| $P_{23}$—Lock in $R_{21}$ | | X |
| $R_{24}$—Match relay | | |
| $P_{24}$—Lock in $R_9$ | | X |
| $P_{24a}$—Special service circuit desposit | X | |
| $P_{24d}$—Energize $R_{23}$ | | X |
| $P_{24h}$—Energize Sol. 21 | | X |
| $P_{24e}$—Conveyor clutch energizer | | X |
| $P_{24f}$—Print energize | | X |
| $P_{24g}$—Open money pulse circuit | X | |
| $P_{24c}$—Energizes Sol. 15–20 | | X |
| $R_{25}$—Match relay hundreds | | |
| $P_{25a}$—Lock in match relay $R_{23}$ | | X |
| $P_{25}$—Lock in match relay $R_{24}$ | | X |
| $R_{26}$—Reset and print circuit relay | | |
| $P_{26a}$—Locks in $R_9$ | X | |
| $P_{26b}$—Resets $SS_{10}$ | | X |
| $P_{26c}$—Resets $SS_{11}$ | | X |
| $P_{26d}$—Resets $SS_{12}$ | | X |
| $P_{26e}$—Resets $SS_{14}$ | | X |
| $P_{26f}$—Resets $SS_7$ | | X |
| $P_{26g}$—Resets $SS_9$ | | X |
| $P_{26}$—Resets $SS_8$ | | X |
| $P_{26h}$—Locks in $R_{26}$ | | X |
| $P_{26d}$—Locks in $R_1$ | | X |
| $P_{26k}$—Energizes reset and receipt | | X |
| $P_{26j}$—Energizes Sol. 21 | X | |
| $P_{25m}$—Resets $SS_4$ | | X |
| $R_{27}$—Special services relay | | |
| $P_{27a}$—Circuit energizing and $R_{27}$ lock in | | X |
| $P_{27}$—Locks in $R_2$ | X | |
| $P_{27}$—Locks in $R_{32}$ | | X |
| $R_{28}$— | | |
| $P_{28a}$—Lock in $R_{28}$ | | X |
| $P_{28}$—Locks in $R_{26}$ | | X |
| $R_{29}$—Door clutch relay opening | | |
| $P_{29}$—Energizes door clutch 29' | | X |
| $P_{29a}$—Locks in $R_{29}$ | | X |
| $R_{30}$—Door clutch relay closing | | |
| $P_{30}$—Locks in relay 30 | | X |
| $R_{31}$— | | |
| $R_{32}$—Package circuit transfer relay | | |
| $P_{32a}$—Locks in $R_{32}$ | | X |
| $P_{32b}$—Releases $SW_2$ | X | |
| $P_{32c}$—Lock out $SS_2$ | | X |
| $P_{32d}$—Steps $SS_{15}$ | X | |
| $P_{32}$—Energizes type package circuit | | X |
| $R_{33}$–$R_{41}$—Zone lock in relays | | |
| $P_{33}$—Energizes Sol. 6 | | X |
| $P_{33a}$—Circuit analyzer for $R_{32}$ | | X |
| $P_{33b}$—Circuit analyzer for $R_1$ | | X |
| $R_{90}$—Circuit choosing relay | | |
| $P_{90}$—Steps $SS_{10}$ | | X |
| $P_{90a}$—Circuit control $SS_{10b}$ | | X |
| $R_{91}$—Circuit choosing relay | | |
| $P_{91}$—Steps $SS_{11}$ | | X |
| $P_{91a}$—Circuit control $SS_{11b}$ | | X |
| $R_{92}$—Circuit choosing relay | | |
| $P_{92}$—Steps $SS_{12}$ | | X |
| $P_{92a}$—Circuit control $SS_{12b}$ | | X |
| $R_{93}$—Circuit choosing relay | | |
| $P_{93}$—Step $SS_{14}$ | | X |
| $P_{93a}$—Circuit control $SS_{14b}$ | | X |
| $R_{100}$—SW3 lockout relay | | |
| $P_{100a}$—Opens $SW_3$ circuit | X | |
| $R_{42-47}$—Money relays | | |
| $R_{42a}$—Locks in $R_3$ coin counting relay | | X |
| $R_{42d}$—Locks in money relay 424 | | X |
| $R_{42c}$—Coin locks out solenoid contact | | X |
| $R_3$—Coin value counting lock out relay | | |
| $P_{3a}$—Steps $SS_{16}$ | | X |
| $P_{3b}$—Locks in $R_3$ | | X |
| $P_{3c}$—Pulse counting release contact | X | |
| $P_3$—Locks sol. 21 | X | |

In a general manner, while there has been disclosed in the above description, what is deemed to be the most practical and efficient embodiment of the invention, it will be understood that the invention is not limited to such embodiment as changes may be made in the arrangement, disposition and form of the parts without departing from the principle of the present invention as comprehended within the scope of the accompanying claims.

I claim:
1. An automatic mailing machine comprising in combination a multicontact switch capable of electrically representing the cost of mailing a package on its contacts in response to pulses received, means for converting selected mailing intelligence into pulses and sending said pulses to said switch for cost representation, an apparatus for displaying said cost representation in currency, second means for accepting currency equal to said cost representation, and third means responsive to said second means for matching said contacts on said switch.

2. An automatic mailing machine comprising in combination a routing receptacle for a parcel to be mailed, a multicontact switch capable of electrically representing the cost of mailing said parcel on particular of its contacts in response to pulses received, means for converting selected mailing intelligence into pulses and sending said pulses to said switch for cost representation in currency, second means for accepting coins equal to said cost representation and matching said particular contacts on said switch, and means for activating said routing receptacle when said contacts are matched.

3. An automatic mailing machine comprising in combination a conveyor system to route a parcel to a destination, a multicontact switch capable of electrically representing the cost of mailing a package on particular contacts thereof in response to pulses received, first means for receiving mailing intelligence by said machine and converting said intelligence into pulses and sending said pulses to said switch for cost representation, an apparatus for displaying said cost representation in currency, second means for accepting coins equal to said cost representation, and third means responsive to said second means for matching said contacts on said switch and activating said conveyor.

4. The machine as described in claim 3 wherein said conveyor is a weight determining device which sends weight intelligence to said first means.

5. An automatic mailing machine for computing the mailing charges of a parcel in response to settings of classification and zone set in the machine by an operator comprising in combination, a device to weigh said parcel, means for converting the weight determined by said device into a proportionate number of discrete pulses, a panel having a plurality of levels corresponding respectively to a selected classification of said parcel, said levels each having a multi-contact bank, first means for selecting one of said levels, second means for selecting a number of contacts along said banks corresponding to a selected zone, and third means for multiplying said number of pulses times the number of contacts selected by said second means to obtain a product in pulses, whereby the basic cost of mailing said parcel is proportionate to said product with respect to weight, zone and classification.

6. An automatic mailing machine for computing the mailing charges of a parcel in response to settings of classification and zone set in the machine by an operator comprising in combination, a device to weigh said parcel, means for converting the weight determined by said device into a proportionate number of discrete pulses, a panel having a plurality of levels corresponding respectively to the selected classification of said parcel, said levels each having a multi-contact bank, first means for selecting one of said levels, second means for selecting a number of contacts along said banks corresponding to a selected zone, and third means for multiplying said number of pulses times the number of contacts selected by said second means to obtain a product of impulses, and fourth means for converting said pulses into charge representation.

7. An automatic mailing machine for computing the mailing charges of a parcel in response to settings of classification and zone set in the machine by an operator comprising in combination, a device to weigh said parcel, means for converting the weight determined by said device into a proportionate number of pulses, a panel having a plurality of levels corresponding respectively to the selected classification of said parcel, said levels each having a multi-contact bank, first means for selecting one of said levels, second means for selecting a number of contacts along said banks corresponding to a selected zone, and third means for multiplying said number of pulses times the number of contacts selected by said second means to obtain a product of impulses, and coin receiving means for accepting coins equal to said cost representation, and fifth means for producing pulses equal to said product of pulses in response to coins received in said coin receiving means.

8. An automatic mailing machine comprising in combination a multicontact switch capable of electrically representing the cost of mailing a parcel on its contacts in response to pulses received, first means to weigh said parcel and convert said weight into a first number of pulses, second means for converting further selected mailing intelligence into a second number of pulses and combining said first and second number of pulses and sending them to said switch for cost representation, an apparatus for displaying said cost representation in currency, third means for accepting coins equal to said cost representation, and fourth means responsive to said third means for matching said contacts on said switch.

9. An automatic mailing machine comprising in combination, a housing having a parcel receiving receptacle, a multicontact switch capable of electrically representing the cost of mailing a parcel on its contacts in response to pulses received, a conveyor along the bottom of said receptacle, means connected to said conveyor to weigh a parcel placed thereon, first means to convert said weight into a first number of pulses, second means for converting further selected mailing intelligence into a second number of pulses and combining said first and second number of pulses and sending them to said switch for cost representation, an apparatus for displaying said cost representation in currency, third means for accepting coins equal to said cost representation, and fourth means responsive to said third means for matching said contacts on said switch, and means responsive to said matching to activate said conveyor.

10. An automatic mailing machine comprising, a housing having a parcel receiving receptacle therein, a conveyor along the bottom of said receptacle, resilient mountings supporting said conveyor to said frame so that said conveyor will vertically deflect in response to the weight of a parcel placed thereon, means converting said conveyor deflection into mailing weight intelligence, a control panel having levers thereon for setting further intelligence into said machine, means combining said weight intelligence and said further intelligence to provide a basic charge, means to satisfy said basic charge, and means activating said conveyor in response to said means to satisfy, whereby said conveyor will remove said package from said receptacle.

11. An automatic mailing machine comprising in combination a routing conveyor for a parcel to be mailed, a multicontact panel electrically representing the cost of mailing said parcel on particular of its contacts in response to pulses received, means for converting selected mailing intelligence into pulses and sending said pulses to said panel for cost representation, second means for accepting coins equal to said cost representation and matching said particular contacts on said switch, and means for activating said routing conveyor when said contacts are matched.

12. An automatic mailing machine comprising, a housing having a parcel receiving receptacle having a front opening and a rear opening, a first conveyor along the bottom of said receptacle, resilient mountings supporting said first conveyor to said frame so that said conveyor will vertically deflect in response to the weight of a parcel placed thereon, means converting said conveyor deflection into mailing weight intelligence, a control panel having a lever operated multicontact switch thereon for setting zone intelligence into said machine, means combining said weight intelligence and said zone intelligence to provide a basic charge, means to satisfy said basic charge, and means activating said conveyor in response to said means to satisfy, a second conveyor positioned at the discharging end of said first conveyor to receive parcels therefrom, and gates spaced along the length of said second conveyor responsive to said lever setting to eject said parcels from said second conveyor at selected gates.

13. The automatic mailing machine described in claim 12 wherein a plurality of third conveyors are spaced along the length of said second conveyor at each of said gates respectively, said third conveyors each representing a zone and city to which said parcels are to be sent.

14. An automatic mailing machine comprising in combination a conveyor system to route a parcel to a destination, a multicontact switch capable of electrically representing the cost of mailing a package on particular contacts thereof in response to pulses received, a panel on said machine, a plurality of levers on said panel having associated contact blanks such that settings of zone, classification, and special services may be set into said machine, first means for receiving said settings and converting said settings into pulses and sending said pulses to said switch for cost representation, an apparatus for displaying said cost representation in currency, second means for accepting coins equal to said cost representation, and third means responsive to said second means for matching said contacts on said switch and activating said conveyor.

15. An automatic mailing machine comprising in combination a multicontact switch capable of electrically representing the cost of mailing a parcel on its contacts in response to pulses received, first means to weigh said parcel and convert said weight into a first number of pulses, second means for converting further selected mailing intelligence into a second number of pulses and combining said first and second number of pulses into a third number of pulses, third means for converting selected fixed rate mailing charges into pulses and adding them to said third number of pulses to obtain a final total proportionate to a cost representation, and sending said representation to said switch, an apparatus for displaying said cost representation in currency, fourth means for accepting coins equal to said cost representation, and fifth means responsive to said fourth means for matching said contacts on said switch.

16. An automatic machine comprising in combination a multicontact switch capable of electrically representing the cost of servicing a package on its contacts in response to pulses received, means for converting selected handling intelligence into pulses and sending said pulses to said switch for cost representation, an apparatus for displaying said cost representation in currency, second means for accepting currency equal to said cost representation, and third means responsive to said second means for matching said contacts on said switch.

17. An automatic machine for representing the cost of servicing a package in response to settings of classification and zone set in the machine by an operator comprising in combination, a device to weigh said parcel, means for converting the weight determined by said device into a proportionate number of discrete pulses, a pulse receiving means having a plurality of channels corresponding respectively to the select classification of said parcel, first means for selecting one of said channels, second means for selecting quantity in said channels corresponding to a selected zone, and third means for multiplying said number of pulses by the quantity selected by the second means to obtain a product of impulses, and fourth means for converting said pulses into charges representation.

References Cited by the Examiner

UNITED STATES PATENTS

| | | | |
|---|---|---|---|
| 1,712,700 | 5/1929 | Hardenbergh | 209—121 |
| 1,990,304 | 2/1935 | Mulford et al. | 235—61 |
| 2,663,398 | 12/1953 | Skillman | 235—151 |
| 2,727,391 | 12/1955 | Kolisch | 235—61 |
| 2,728,466 | 12/1955 | Postlewaite et al. | 235—98 |
| 2,737,382 | 3/1956 | Van Duyn | 235—61 |
| 2,825,476 | 3/1958 | Muller | 214—11 |
| 2,990,965 | 7/1961 | Smoll et al. | 209—74 |
| 3,000,519 | 9/1961 | Purnell. | |
| 3,016,191 | 1/1962 | Buchholz et al. | 235—151 |
| 3,057,547 | 10/1962 | Adler et al. | 235—1 |

FOREIGN PATENTS 741,124   11/1955   Great Britain.

MALCOLM A. MORRISON, *Primary Examiner.*

WALTER W. BURNS, JR., *Examiner.*

K. W. DOBYNS, C. L. WHITHAM, *Assistant Examiners.*